(12) United States Patent
Lacko et al.

(10) Patent No.: US 10,421,320 B2
(45) Date of Patent: Sep. 24, 2019

(54) PNEUMATIC VEHICLE TIRE

(71) Applicant: Continental Reifen Deutschland GmbH, Hannover (DE)

(72) Inventors: Michal Lacko, Puchov (SK); Matthias Gehlauf, Sehnde (DE); Fabian Wachmann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/187,363

(22) Filed: Jun. 20, 2016

(65) Prior Publication Data

US 2016/0303915 A1 Oct. 20, 2016

Related U.S. Application Data

(63) Continuation of application No. PCT/EP2014/073411, filed on Oct. 31, 2014.

(30) Foreign Application Priority Data

Dec. 18, 2013 (DE) .......................... 10 2013 226 442

(51) Int. Cl.
*B60C 9/20* (2006.01)
*B60C 9/28* (2006.01)
(Continued)

(52) U.S. Cl.
CPC ............... *B60C 9/20* (2013.01); *B60C 9/005* (2013.01); *B60C 9/0007* (2013.01); *B60C 9/02* (2013.01);
(Continued)

(58) Field of Classification Search
CPC ..................................................... B60C 9/2006
See application file for complete search history.

(56) References Cited

U.S. PATENT DOCUMENTS

| 3,677,319 A | * | 7/1972 | Mirtain | ................ | B60C 9/2009 |
| | | | | | 152/527 |
| 3,730,246 A | * | 5/1973 | Sidles | ................... | B29D 30/22 |
| | | | | | 152/527 |

(Continued)

FOREIGN PATENT DOCUMENTS

FR      2 566 334 A1     12/1985

OTHER PUBLICATIONS

International Search Report dated Jan. 27, 2015 of international application PCT/EP2014/073411 on which this application is based.

*Primary Examiner* — Jodi C Franklin

(57) ABSTRACT

A pneumatic vehicle tire has a carcass, a belt and a profiled tread. The belt includes four belt plies wherein the third belt ply and the fourth belt ply are working plies. The reinforcement members of the working plies are arranged at an angle to the circumferential direction of 10° to 45° and the reinforcement members of the fourth belt ply at an angle of 10° to 45°. The reinforcement members of the third and fourth belt plies are arranged such that they cross one another. The reinforcement members of the first belt ply are arranged at an angle of 40° to 75° and the reinforcement members of the second belt ply are arranged at an angle of 0° to 5° to the circumferential direction. The reinforcement members of the third belt ply and the reinforcement members of the first belt ply have the same direction of inclination.

8 Claims, 4 Drawing Sheets

(51) Int. Cl.
*B60C 9/22* (2006.01)
*B60C 9/00* (2006.01)
*B60C 9/02* (2006.01)
*B60C 11/00* (2006.01)

(52) U.S. Cl.
CPC .......... *B60C 9/2006* (2013.01); *B60C 9/2009* (2013.01); *B60C 9/22* (2013.01); *B60C 9/28* (2013.01); *B60C 11/00* (2013.01); *B60C 2009/0071* (2013.01); *B60C 2009/2012* (2013.01); *B60C 2009/2016* (2013.01); *B60C 2009/2019* (2013.01); *B60C 2009/2022* (2013.01); *B60C 2009/2093* (2013.01); *B60C 2009/228* (2013.01); *B60C 2009/2214* (2013.01); *B60C 2200/06* (2013.01)

(56) References Cited

U.S. PATENT DOCUMENTS

| | | | | |
|---|---|---|---|---|
| 3,757,843 A * | 9/1973 | Carr | | B60C 9/2009 152/527 |
| 4,308,083 A * | 12/1981 | Toth, Jr. | | B29D 30/08 152/209.6 |
| 4,474,633 A * | 10/1984 | Watts | | B29D 30/0645 152/526 |
| 4,498,514 A * | 2/1985 | Maathuis | | B60C 9/22 152/527 |
| 4,688,615 A * | 8/1987 | Lee | | B60C 9/2009 152/531 |
| 4,883,108 A * | 11/1989 | Takahashi | | B60C 9/2009 152/531 |
| 5,164,028 A * | 11/1992 | Uemura | | B60C 9/18 152/527 |
| 5,385,193 A * | 1/1995 | Suzuki | | B60C 9/14 152/525 |
| 5,738,740 A * | 4/1998 | Cluzel | | B60C 9/1821 152/454 |
| 6,082,425 A * | 7/2000 | Colom | | B60C 9/2006 152/454 |
| 6,131,632 A * | 10/2000 | Fukumoto | | B60C 9/18 152/454 |
| 6,499,522 B1 * | 12/2002 | Cluzel | | B60C 9/2006 152/527 |
| 6,619,357 B1 * | 9/2003 | Gillard | | B60C 9/0007 152/531 |
| 6,668,889 B1 * | 12/2003 | Losey | | B60C 9/20 152/527 |
| 7,252,128 B2 * | 8/2007 | Ferlin | | B60C 9/1821 152/527 |
| 7,575,031 B2 * | 8/2009 | Manno | | B60C 9/2006 152/531 |
| 7,735,534 B2 * | 6/2010 | Manno | | B60C 9/2006 152/454 |
| 9,168,789 B2 * | 10/2015 | Nicolas | | B60C 9/2006 |
| 9,315,074 B2 * | 4/2016 | Bederna | | B60C 9/2006 |
| 2004/0089391 A1 * | 5/2004 | Jallais | | B60C 9/09 152/527 |
| 2005/0173042 A1 * | 8/2005 | Palgen | | B60C 9/2006 152/534 |
| 2006/0169381 A1 * | 8/2006 | Radulescu | | B60C 9/2006 152/531 |
| 2007/0131331 A1 * | 6/2007 | Neubauer | | B60C 9/0007 152/527 |
| 2007/0169870 A1 * | 7/2007 | Manno | | B60C 9/2006 152/531 |
| 2008/0295934 A1 * | 12/2008 | Mafune | | B60C 19/08 152/152.1 |
| 2010/0116402 A1 * | 5/2010 | Isobe | | B60C 9/2006 152/526 |
| 2010/0300597 A1 * | 12/2010 | Yamazaki | | B60C 9/2006 152/527 |
| 2011/0253279 A1 * | 10/2011 | Daghini | | B60C 9/0007 152/526 |
| 2012/0060995 A1 * | 3/2012 | Maruoka | | B60C 9/28 152/527 |
| 2012/0211140 A1 * | 8/2012 | Johnson | | B60C 15/0027 152/539 |
| 2013/0042954 A1 * | 2/2013 | Becker | | B60C 9/2006 152/535 |
| 2013/0240109 A1 * | 9/2013 | Kato | | B60C 15/0072 152/553 |
| 2013/0327467 A1 * | 12/2013 | Becker | | B29D 30/22 156/124 |
| 2014/0008001 A1 * | 1/2014 | Becker | | B60C 9/2006 152/527 |
| 2014/0238573 A1 * | 8/2014 | Herta | | B60C 9/2006 152/535 |
| 2014/0261952 A1 * | 9/2014 | Tanaka | | B60C 9/2009 152/535 |
| 2015/0360516 A1 | 12/2015 | Mori | | |

* cited by examiner

PNEUMATIC VEHICLE TIRE

CROSS REFERENCE TO RELATED APPLICATIONS

This application is a continuation application of international patent application PCT/EP2014/073411, filed Oct. 31, 2014, designating the United States and claiming priority from German application 10 2013 226 442.9, filed Dec. 18, 2013, and the entire content of both applications is incorporated herein by reference.

FIELD OF THE INVENTION

The invention relates to a pneumatic vehicle tire for utility vehicles, having a carcass, having a belt which is constructed radially outside the carcass and having a profiled tread which is constructed on the belt radially outside the belt, wherein the belt is formed from at least four belt plies arranged lying one on top of the other from the radial inside to the radial outside, wherein the first belt ply, which is arranged furthest to the inside in the radial direction R, is formed with parallel reinforcement members embedded in rubber, the second belt ply, arranged on the first belt ply, is formed with parallel reinforcement members embedded in rubber, the third belt ply, arranged on the second belt ply, is formed with parallel reinforcement members embedded in rubber, and the fourth belt ply, arranged on the third belt ply, is formed with parallel reinforcement members embedded in rubber.

BACKGROUND OF THE INVENTION

Conventional pneumatic tires for utility vehicles usually have a four-ply belt with a so-called triangular configuration in which two working plies are arranged one on top of the other in a radial direction, the steel cords of which are each at an angle of approximately 15° to 30° with respect to the circumferential direction, wherein the steel cords of one working ply and those of the second working ply are inclined in different axial directions A. The working plies thereby form a cross-braced structure. In such belts there is usually a belt ply embodied as a barrier ply which is located under the working plies, the steel cords of which barrier ply are at an angle of 45° to 65° with respect to the circumferential direction, as a result of which the cords of the working plies and of the barrier ply form a triangular structure. In addition, an additional protective ply which forms the fourth belt ply is usually formed above the two working plies, the steel cords of which protective ply are also at an angle of approximately 15° to 30° with respect to the circumferential direction of the vehicle tire. Such belts have a limited circumferential stiffness. The mobility of the belt edges made possible in this way can have an adverse effect on the durability of the tire. The belt may also be subject to radial expansion during operation. This growth can lead to excessive uneven wear of the tire.

It is also known to form pneumatic tires for utility vehicles with a four-ply arrangement with a radially inner barrier ply with steel cords which enclose an angle of approximately 45° to 65° with respect to the circumferential direction, with two working plies which are formed over the barrier ply and which, in a conventional way, form a cross-braced structure of their steel cords with an orientation of the steel cords of in each case approximately 15° to 30°, and with a fourth belt ply which is formed radially outside the two working plies on the outer working ply and which is embodied as a so-called 0°-ply, wherein the reinforcement members thereof composed of steel cords are oriented substantially in the circumferential direction with an angle of 0° to 2.5° with respect to the circumferential direction. In such embodiments, the circumferential stiffness of the belt is increased, which has a positive effect on the durability of the belt. However, the influence of the 0°-ply is limited substantially to the radially outer working ply. However, the inner working ply is formed with residual mobility, still with adverse effects on the durability and wear.

Furthermore, occasionally—for example in U.S. Pat. No. 9,315,074—an embodiment of a pneumatic tire for a utility vehicle having a four-ply belt arrangement has been proposed, with a radially inner barrier ply with steel cords which enclose an angle of 50° with respect to the circumferential direction. Two working plies are formed radially outside the barrier ply. A 0°-ply is formed radially between the two working plies. In these embodiments, the two working plies are again formed in a cross-braced structure, and the steel cords thereof are oriented at angles of in each case 20° with respect to the circumferential direction. Such embodiments make it possible to realize a high circumferential strength and, in relation to a conventional pneumatic tire for utility vehicles, improved durability and an improved wear pattern. Nevertheless, even in the case of such embodiments of tires for utility vehicles, in the case of intense pressure loading in the center of the footprint and relatively considerably reduced pressure in the shoulder region, undesirably intensely pronounced uneven wear can still occur.

SUMMARY OF THE INVENTION

It is an object of the invention to provide a pneumatic vehicle tire for utility vehicles having at least four belt plies, in which, in a simple manner, and utilizing the advantages of the embodiment of a four-ply belt with two working plies, a zero ply and a barrier ply, it is made possible to achieve further reduced and moderate wear.

According to an embodiment, a pneumatic vehicle tire for utility vehicles has a carcass having a belt which is constructed radially outside the carcass and has a profiled tread which is constructed radially on the outer side of the belt. The belt is formed from at least four belt plies arranged lying one on top of the other from the radial inside to the radial outside, wherein the first belt ply, which is arranged furthest to the inside in the radial direction R, is formed with parallel reinforcement members embedded in rubber, the second belt ply, arranged on the first belt ply, is formed with parallel reinforcement members embedded in rubber, the third belt ply, arranged on the second belt ply, is formed with parallel reinforcement members embedded in rubber, and the fourth belt ply, arranged on the third belt ply, is formed with parallel reinforcement members embedded in rubber. The third belt ply and the fourth belt ply are working plies, in which the reinforcement members of the third belt ply enclose, in terms of their orientation, an angle $\alpha$ with the circumferential direction U, where $10°\leq\alpha\leq45°$, and the reinforcement members of the fourth belt ply each enclose, in terms of their orientation, an angle $\gamma$ with the circumferential direction U, where $10°\leq\gamma\leq45°$, wherein, as viewed in the circumferential direction U of the vehicle tire, the reinforcement members of the third belt ply have an opposite axial direction of inclination in relation to the reinforcement members of the fourth belt ply, and wherein the reinforcement members of the first belt ply enclose, in terms of their orientation, an angle $\varepsilon$ with the circumferential direction U, where $40°\leq\varepsilon\leq75°$, and the reinforcement members of the second belt ply enclose, in terms of their orientation, an angle β with the circumferential direction U, where 0°≤β≤5°, wherein, as viewed in the circumferential direction U, the reinforcement members of the third belt ply and the reinforcement members of the first belt ply have the same axial direction of inclination.

The embodiment makes it possible to maintain the embodiment with two working plies, a 0°-ply and a radially inner barrier ply, which is advantageous with regard to good force transmission in the circumferential and lateral directions and with regard to low wear. It has furthermore been found that, by way of the arrangement according to the invention of the belt plies, the wear can be further homogenized and reduced across the belt width.

An embodiment of a pneumatic vehicle tire, wherein the third belt ply is formed so as to be larger, in terms of its axial extent in the pneumatic vehicle tire, than all of the other belt plies of the belt is particularly advantageous. This permits decoupling of the third and fourth belt plies, whereby the durability of the tire can be further improved.

An embodiment of a pneumatic vehicle tire, wherein the second belt ply is formed so as to be smaller, in terms of its axial extent in the pneumatic vehicle tire, than the other three belt plies of the belt is particularly advantageous. This permits a uniform increase in strength from belt edge to belt center, further promoting good wear and long structural durability.

An embodiment of a pneumatic vehicle tire is advantageous, wherein, radially outside the radially outer working ply on the outer working ply, there is arranged a fifth belt ply with parallel reinforcement members embedded in rubber, which reinforcement members, in terms of their orientation, enclose an angle δ with the circumferential direction U of the pneumatic vehicle tire, where 40°≤δ≤75°—in particular where δ=50°—and wherein, as viewed in the circumferential direction U of the vehicle tire, the reinforcement members of the fifth belt ply have an opposite axial direction of inclination relative to the reinforcement members of the first belt ply and have the same axial direction of inclination as the reinforcement members of the fourth belt ply. In this way, the stiffness of the belt and the structure lateral force (angle effect) can be additionally increased. The loading on the uppermost working ply can be reduced owing to cord forces sloping in the same direction.

In order to achieve an improved wear pattern, an embodiment of a pneumatic vehicle tire, wherein the fifth belt ply is formed, in terms of its axial extent in the pneumatic vehicle tire, so as to be smaller than the third belt ply and larger than 70% of the width of the second belt ply is particularly advantageous.

An embodiment of a pneumatic vehicle tire, wherein the reinforcement members of the third belt ply and the reinforcement members of the fourth belt ply are steel cords is particularly advantageous.

An embodiment of a pneumatic vehicle tire, wherein the reinforcement members of the two working plies in the tire are configured to be extensible, with an elongation D of D≥0.2% at 10% of the breaking force is particularly advantageous. In this way, by way of flexibility of the belt pack, the durability of the tire can be further promoted.

An embodiment of a pneumatic vehicle tire, wherein the reinforcement members of the second belt ply are reinforcement members made of steel is particularly advantageous. In this way, a high level of circumferential stiffness and good durability and more uniform wear are further promoted. Furthermore, controlled tire expansion is promoted.

An embodiment of a pneumatic vehicle tire, wherein the reinforcement members of the second belt ply are steel cords which, at 10% of the breaking force, exhibit an elongation D of D≥0.2%—in particular of D≥1% is particularly advantageous.

In this way, the raising of the belt in the construction process can be made possible in a simple manner.

An embodiment of a pneumatic vehicle tire, wherein the reinforcement members of the first belt ply are steel cords. A high level of compression stiffness can be achieved in this way is particularly advantageous.

An embodiment of a pneumatic vehicle tire wherein the reinforcement members of the fifth belt ply are steel cords is particularly advantageous.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
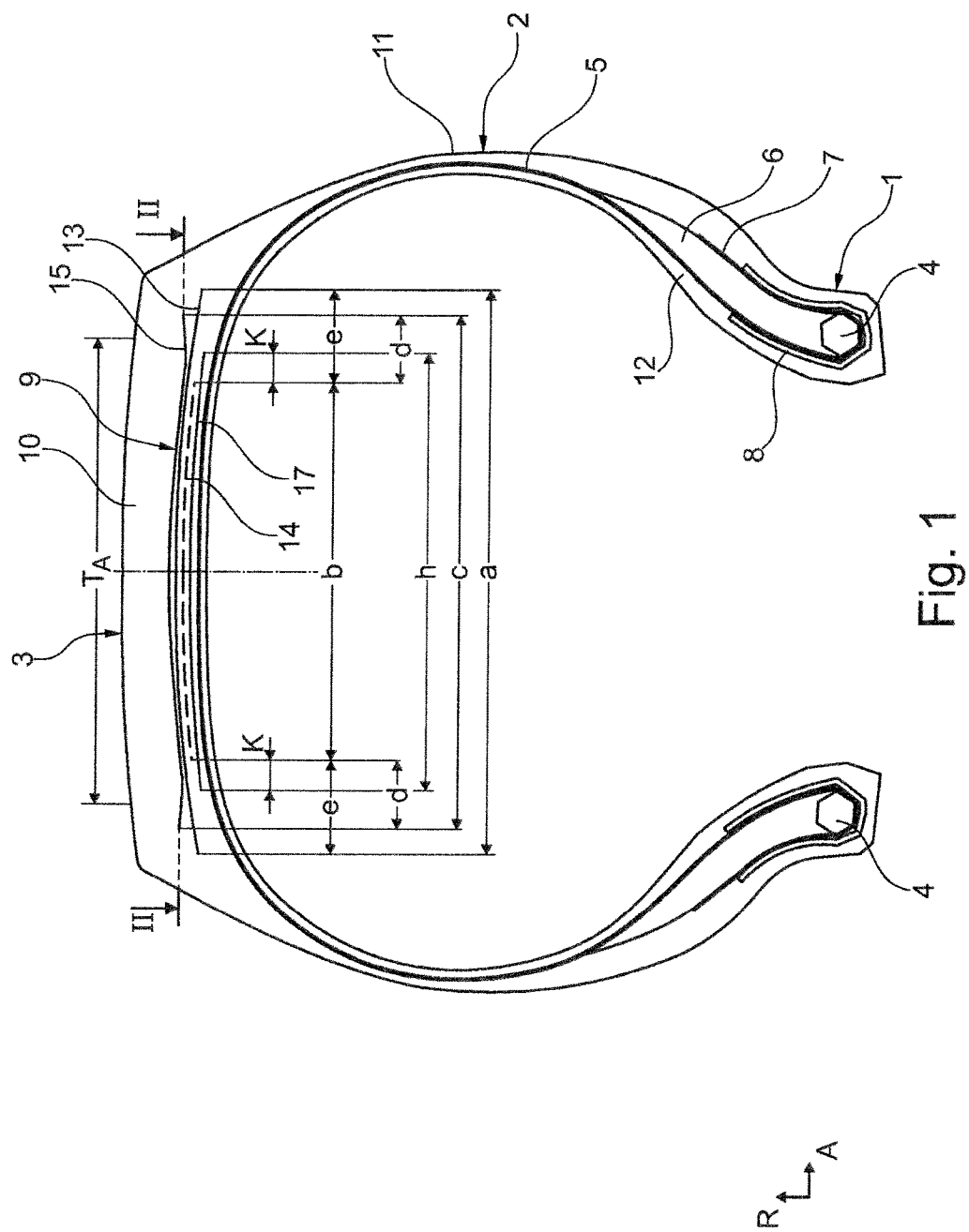
FIG. 1 shows a cross-sectional view of a pneumatic vehicle tire of radial type of construction for utility vehicles.
Figure 2:
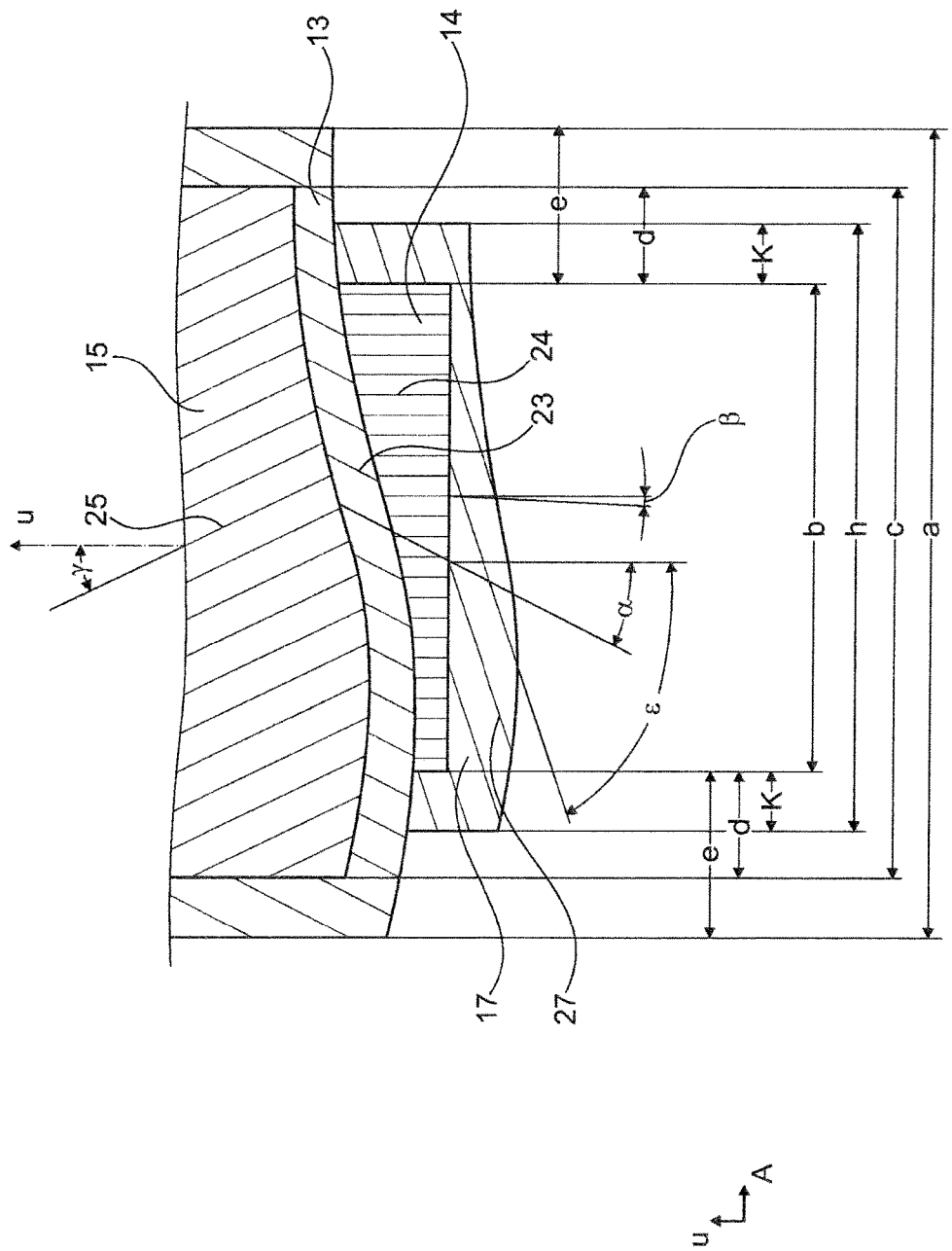
FIG. 2 shows a plan view of the belt from FIG. 1 taken along section line II-II in FIG. 1, wherein for simplicity, all of the other components of the tire have not been shown.

FIG. 1 and FIG. 2 show a pneumatic tire of radial type of construction for utility vehicles, having two side walls 2 which extend in the radial direction R of the vehicle tire and having a crown region 3 which is formed axially between the side walls. The side walls are each formed with a bead region 1 on their extent end facing inward in the radial direction, in which bead region there is formed a bead core 4 of known type, which has high tensile strength in the circumferential direction U and which extends over the circumference of the tire in the circumferential direction. The bead cores 4 are, in a known manner, formed in a wound manner from wire which extends in the circumferential direction U of the pneumatic vehicle tire and which is embedded in rubber. In the conventional manner, an apex (bead filler) 6 which is triangular in cross section is formed from a hard rubber material on the bead cores 4. The pneumatic vehicle tire is formed with a carcass 5 which, starting from the bead core 4 formed in the left-hand bead region 1 of the pneumatic vehicle tire, extends outward in the radial direction R of the pneumatic vehicle tire through the left-hand side wall 2 as far as the crown region 3, and in the crown region 3 extends in the axial direction A of the pneumatic vehicle tire to the right-hand side wall 2, and in the right-hand side wall 2 of the pneumatic vehicle tire extends radially inward as far as the bead core 4 formed in the bead region 1 of the right-hand side wall 2. The carcass is, in both core regions 1, formed so as to extend radially outward in each case along the axial inner side of the bead core 4 to the radial inner side of the corresponding bead core 4, then as an extension in the axial direction A along the radial inner side of the bead core 4 to the axial outer side of the bead core 4, and then as an extension on the axial outer side of the bead core 4, so as to constitute a turned-over part 7. The carcass 5 extends with its turned-over part 7 along the axial outer side of the apex 6 and ends on the axial outer side of the apex 7. The carcass 5 is formed, in a way which is known but not illustrated in more detail, from a carcass ply which extends in the circumferential direction U over the entire circumference of the pneumatic vehicle tire and which has parallel cords—for example steel cords—which are embedded in rubber and extend substantially in the radial direction R in the region of the side walls 2 and substantially in the axial direction A in the crown region. An inner layer 12 composed of known, particularly air-impermeable rubber material extends from the left-hand bead region 1 as far as the right-hand bead region 1 on that side of the carcass 5 which points toward the inside of the tire. An additional bead reinforcing strip 8, which extends over the entire circumference of the pneumatic vehicle tire, is respectively formed in the bead region 1 on that side of the carcass 5 which points away from the bead core 4. The bead reinforcing strip 8 is, for example, a material strip which is embedded in rubber and composed of parallel reinforcement members of a textile or metallic configuration.

In the region of the tire crown 3, a belt 9, which extends over the entire circumference of the pneumatic vehicle tire in the circumferential direction U and in the axial direction A from the left-hand tire shoulder as far as the right-hand tire shoulder, is formed on the carcass 5, outside the carcass 5 in the radial direction R of the pneumatic vehicle tire, which belt 9 is formed from four belt plies 17, 14, 13, and 15 which are arranged one above the other and so as to lie one on top of the other in the radial direction R from the inside to the outside. A profiled tread 10 of a known configuration, which extends over the entire circumference of the pneumatic vehicle tire in the circumferential direction U and in the axial direction A from the left-hand tire shoulder as far as the right-hand tire shoulder and which completely covers the belt 9, is formed on the belt 9 radially outside the belt 9. In the region of the tire side walls 2, a side wall rubber strip 11, which extends in the radial direction R from the bead region 1 as far as the profiled tread 10 in the crown region 3, is formed in a known manner on that side of the carcass 5 which points away axially from the tire.

That belt ply 17 of the belt which is arranged furthest to the inside in the radial direction R forms the first belt ply 17. That belt ply 14 which is arranged on the first belt ply 17, outside the first belt ply 17 in the radial direction R, forms the second belt ply 14. That belt ply 13 which is arranged on the second belt ply 14, outside the second belt ply 14 in the radial direction R, forms the third belt ply 13. That belt ply 15 which is arranged on the third belt ply 13, outside the third belt ply 13 in the radial direction R, forms the fourth belt ply 15.

The belt ply 13 and the belt ply 15 are embodied as working plies of the tire and extend in each case in the circumferential direction U over the entire circumference of the pneumatic vehicle tire and, in contact with one another, in the axial direction A from the left-hand tire shoulder as far as the right-hand tire shoulder. The working ply 13 is formed from a ply of filiform parallel reinforcement members 23 which are embedded in rubber and which extend substantially rectilinearly over the entire width (a), measured in the axial direction A, of the belt ply 13 and which enclose an angle of inclination $\alpha$ with respect to the circumferential direction U, where $10°\leq\alpha\leq45°$. The working ply 15 is formed from a ply of filiform parallel reinforcement members 25 which are embedded in rubber and which extend substantially rectilinearly over the entire axial width (c) of the belt ply 15 and which enclose an angle of inclination $\gamma$ with respect to the circumferential direction U, where $10°\leq\gamma\leq45°$. The direction of inclination of the reinforcement members 25 of the working plies 15 as viewed along the circumferential direction U is oriented in the opposite axial direction A in relation to the direction of inclination of the reinforcement members 23 of the working ply 13.

The second belt ply 14, which is formed between the first belt ply 17 and the lower of the two working plies 13 in the radial direction R, extends in the circumferential direction U over the entire circumference of the pneumatic vehicle tire and in the axial direction A from the left-hand tire shoulder to the right-hand tire shoulder, and is embodied as a 0°-ply. For this purpose, the belt ply 14 is formed from parallel filiform reinforcement members which are embedded in rubber and which extend linearly over the entire circumference of the pneumatic vehicle tire so as to enclose an angle $\beta$, where $0°\leq\beta\leq5°$, with respect to the circumferential direction U and which are therefore oriented substantially in the circumferential direction U of the pneumatic vehicle tire.

All four belt plies 17, 13, 14 and 15 extend to both axial sides, in each case as far as a position in the respective tire shoulder. The belt ply 14 is, at least over a part of its axial extent, in direct contact with the third belt ply (lower working ply) 13 arranged thereabove.

The second belt ply (0°-ply) 14 extends in the axial direction A over an axial width (b), the third belt ply (lower working ply) 13 extends in the axial direction A over an axial width (a), and the fourth belt ply (upper working ply) 15 extends in the axial direction A over an axial width (c) in the tire, where a>c>b. In this context, the third belt ply 13 extends to both axial sides of the second belt ply 14 by an axial extent length (e) beyond the axial position of the respective belt edge of the second belt ply 14. Likewise, the fourth belt ply 15 extends in both axial directions in each case by an axial extent length (d) beyond the axial position of the respective belt edge of the second belt ply 14. For the extent lengths (e) and (d) of this projecting length, the following applies: e>d. Here, the dimension d is configured to be d>10 mm. In the embodiment, the dimension e is configured to be e<60 mm.

The first belt ply 17, arranged between the second belt ply 14 and carcass 5, extends in the circumferential direction U over the entire circumference of the pneumatic vehicle tire and in the axial direction A of the pneumatic vehicle tire from the left-hand tire shoulder to the right-hand tire shoulder. The belt ply 17 is formed from a ply of filiform parallel reinforcement members 27 which are embedded in rubber and which extend substantially rectilinearly over the entire axial width (h) of the belt ply 17 and which enclose an angle of inclination $\varepsilon$ with respect to the circumferential direction U, where $40°\leq\varepsilon\leq75°$, for example where $\varepsilon=50°$. The reinforcement members 27 of the first belt ply 17 are—as illustrated in FIG. 2—oriented with the same axial direction of inclination, as viewed along the extent in the circumferential direction U of the tire, as the reinforcement members 23 of the third belt ply 13, and thus with an opposite axial direction of inclination in relation to the reinforcement members 25 of the fourth belt ply 15.

The belt ply 17 extends over the entire axial extent of the second belt ply 14 in direct contact with the second belt ply 14, and ends in the axial direction A with its two belt ply edges in each case at an axial position between the axial position of the closest belt ply edge of the second belt ply 14 and the axial position of the closest belt ply edge of the radially outer working ply 15, at an axial distance (k) from the belt ply edge of the second belt ply 14, where k<d<e. The width (h) is the dimension of the axial extent of the first belt ply 17, where b<h<c<a.

The reinforcement members 27 are steel cords of known type, for example of "1+5" type, "3+6" type, "3+8" type or "3+9" type.

The reinforcement members 23 and 25 of the two working plies 13 and 15 are extensible steel cords of known type which, under tensile load, exhibit a breaking force F of F>2500N and, at 10% of the breaking force, an elongation D of D≥0.2%—for example where 0.28%≤D≤0.32%. The elongation D of the reinforcement members is in this case the elongation determined, in the case of the vulcanized tire, on the reinforcement member extracted from the ply. The measurement of the elongation is performed on reinforcement members which have been removed over their full length from the complete vulcanized tire. For the measurement, the reinforcement member has rubber residues removed from it such that the reinforcement member with the amount of rubber remaining thereon has a diameter no greater than 1.5 times the maximum outer diameter of the non-rubberized reinforcement member. The determination of the elongation is performed in accordance with ASTM D 2969-04.

The reinforcement members 23 and 25 are for example steel cords of "3+8×0.35 HT" type, with a breaking force F of approximately 3000 N and with an elongation D of D>0.2% at 10% of the breaking force.

In one embodiment, the reinforcement members 24 are steel cords of known type. In another embodiment, the reinforcement members 24 are steel cords which, at 10% of the breaking force, exhibit an elongation D of D≥0.2%—for example of D=0.5%. In one embodiment, the reinforcement members 24 are steel cords which, at 10% of the breaking force, exhibit an elongation D of D≥1%—for example of D=1.3%.

The reinforcement members 24 are for example steel cords of "3×7 HEHT" type.

In one embodiment, the following values are selected: β=3°, α=18°, γ=18°, ε=50°, d=11 mm, k=8 mm and e=15 mm.

In an alternative embodiment (not illustrated) in relation to the above embodiments, the angle of inclination α of the reinforcement members 23 of the inner working ply 13 is in each case greater than the angle of inclination γ of the reinforcement members 25 of the outer working ply 15.

In an alternative embodiment (not illustrated) in relation to the above embodiments, the angle of inclination α of the reinforcement members 23 of the inner working ply 13 is in each case smaller than the angle of inclination γ of the reinforcement members 25 of the outer working ply 15.

Figure 3:
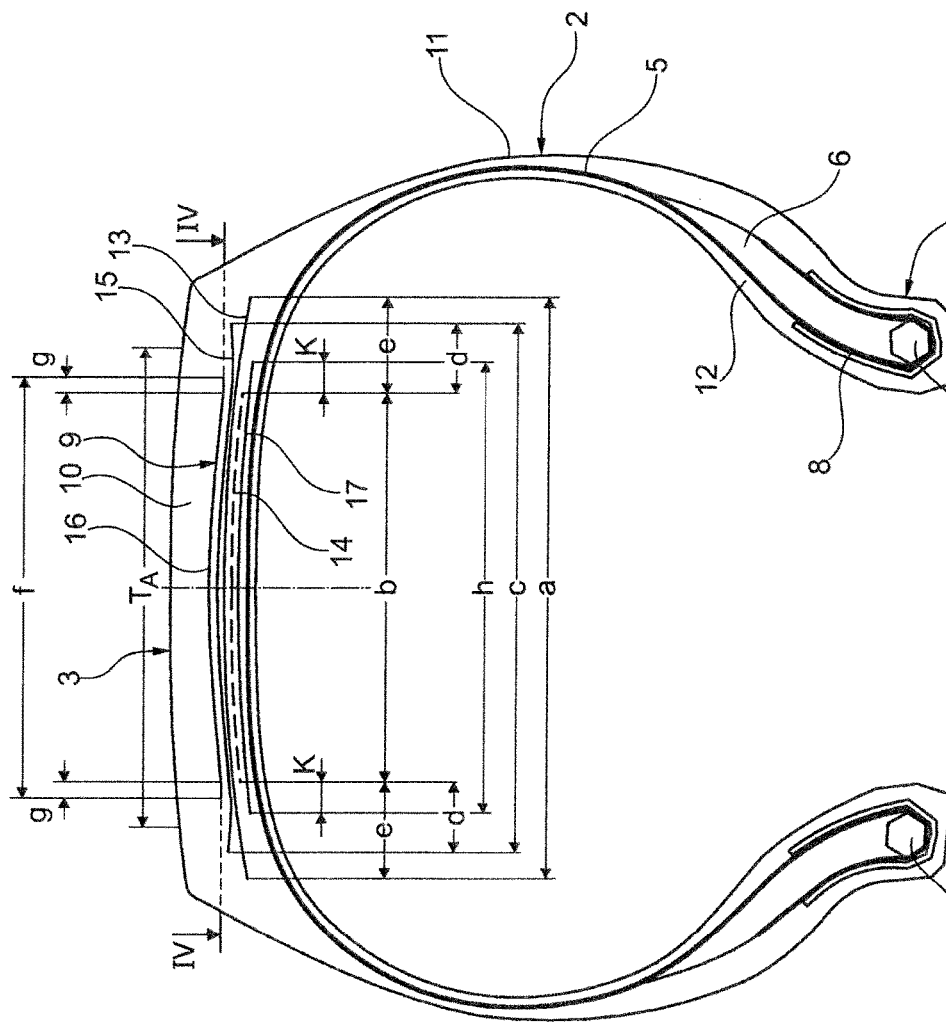
FIG. 3 shows a cross-sectional view of a pneumatic vehicle tire analogous to the illustration of FIG. 1, with an alternative belt embodiment; and, FIG. 4 shows a plan view of the belt from FIG. 3 taken along section line IV-IV in FIG. 3, wherein for simplicity, all of the other components of the tire have not been shown.
Figure 4:
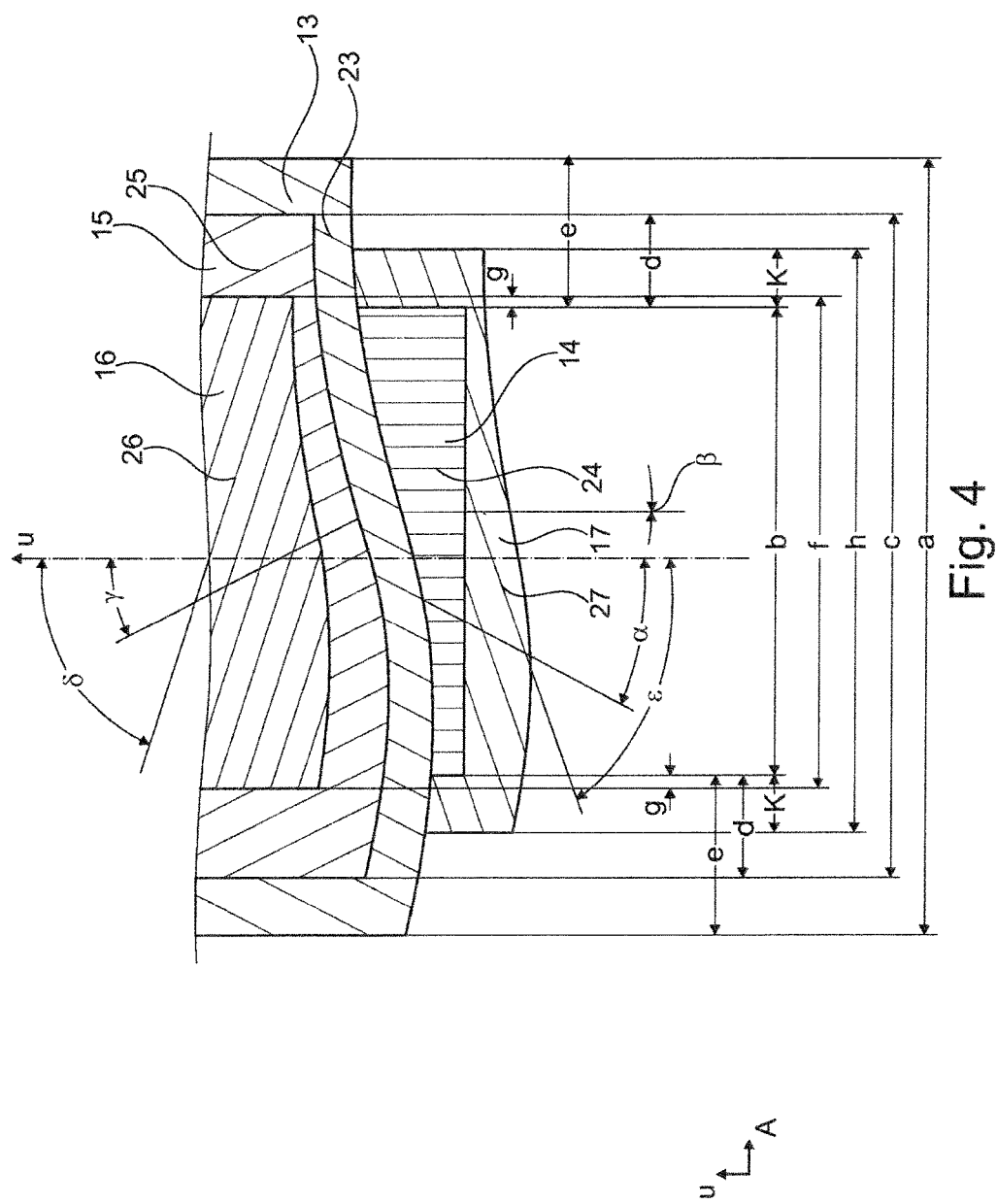

FIG. 3 and FIG. 4 show a further alternative embodiment in which, in addition to the belt plies 17, 13, 14 and 15 illustrated in FIG. 1 and FIG. 2, the belt 9 is formed with an additional, fifth belt ply 16 on the radially outer side of the outer working ply 15, which fifth belt ply extends in the circumferential direction U over the entire circumference of the pneumatic vehicle tire and in the axial direction A of the pneumatic vehicle tire from the left-hand tire shoulder to the right-hand tire shoulder. The belt ply 16 is formed from a ply of filiform parallel reinforcement members 26 which are embedded in rubber and which extend substantially rectilinearly over the entire axial width (f) of the belt ply 16 and which enclose an angle of inclination δ with respect to the circumferential direction U, where 40°≤δ≤75°, for example where δ=50°. The belt ply 16 extends, over its entire axial extent, in direct contact with the working ply 15, and ends in the axial direction A with its two belt ply edges in each case at an axial position between the axial position of the closest belt ply edge of the second belt ply 14 and the axial position of the closest belt ply edge of the fourth belt ply (radially outer working ply) 15, at an axial distance (g) from the belt ply edge of the second belt ply 14, where g<d. The width (f) is the dimension of the axial extent of the fifth belt ply 16, where (0.7 b)<f and where f<a. In the embodiment illustrated, b<f<c<a is selected.

In a further embodiment illustrated in FIGS. 3 and 4, the embodiment is additionally selected to be such that the following apply: f<h and g<k.

The reinforcement members 26 of the fifth belt ply 16 are oriented—as illustrated in FIG. 4—with the same axial direction of inclination, as viewed along the extent in the circumferential direction U of the tire, as the reinforcement members 25 of the fourth belt ply 15 and hence with an opposite axial direction of inclination relative to the reinforcement members 27 of the first belt ply and the reinforcement members 23 of the third belt ply 13.

The reinforcement members 26 are steel cords of known type, for example of "1+5" type, "3+6" type, "3+8" type or "3+9" type.

In the embodiments mentioned above in conjunction with FIGS. 1 to 4, the reinforcement members 27 and the reinforcement members 26 are steel cords. In another embodiment which is not illustrated, the reinforcement members 26 are hybrid cords of known type which are suitable for use in utility vehicle tires, in the case of which filaments or threads are produced from different materials, such as for example steel, polyamide, glass fiber, polyester or aramide. In another embodiment which is not illustrated, the reinforcement members 27 are hybrid cords of known type which are suitable for use in utility vehicle tires, in the case of which filaments or threads are produced from different materials, such as for example steel, polyamide, glass fiber, polyester or aramide.

In another embodiment which is not illustrated, the reinforcement members 23 and/or the reinforcement members 24 and/or reinforcement members 25 are also hybrid cords of known type which are suitable for use in utility vehicle tires, in the case of which filaments or threads are produced from different materials, such as for example steel, polyamide, glass fiber, polyester or aramide.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
1 Bead region
2 Side wall
3 Crown region
4 Bead core
5 Carcass
6 Apex (bead filler)
7 Carcass turn-over
8 Bead reinforcing strip
9 Belt
10 Profiled tread
11 Side wall rubber strip
12 Inner layer
13 Belt ply (working ply)
14 Belt ply (zero-degree ply)

15 Belt ply (working ply)
16 Belt ply
17 Belt ply
23 Reinforcement member
24 Reinforcement member
25 Reinforcement member
26 Reinforcement member
27 Reinforcement member

What is claimed is:

1. A pneumatic vehicle tire for utility vehicles, the pneumatic vehicle tire defining a circumferential direction (U) and a radial direction (R), the pneumatic vehicle tire comprising:
   a carcass;
   at least four belt plies arranged resting one on top of the other radially inward to radially outward and said belt plies conjointly defining a tire belt configured radially outside said carcass;
   a profiled tread constructed radially outside said tire belt and built up on said tire belt;
   said at least four belt plies including a first belt ply arranged furthest inwardly in the radial direction of said at least four belt plies;
   said first belt ply having a plurality of parallel first reinforcement members embedded in rubber;
   said at least four belt plies including a second belt ply arranged on said first belt ply, a third belt ply arranged on said second belt ply and a fourth belt ply arranged on said third belt ply;
   said second belt ply having a plurality of parallel second reinforcement members embedded in rubber;
   said third belt ply having a plurality of parallel third reinforcement members embedded in rubber;
   said fourth belt ply having a plurality of parallel fourth reinforcement members embedded in rubber;
   said third belt ply and said fourth belt ply being configured as working plies;
   said third reinforcement members each having an orientation which, together with the circumferential direction (U), encloses an angle $\alpha$ lying in a range of $10° \leq \alpha \leq 45°$;
   said fourth reinforcement members each having an orientation which, together with the circumferential direction (U), encloses an angle $\gamma$ lying in a range of $10° \leq \gamma \leq 45°$;
   said third reinforcement members having an opposite axial direction of inclination to said fourth reinforcement members as viewed in the circumferential direction (U);
   said first reinforcement members each having an orientation which, together with the circumferential direction (U), encloses an angle $\varepsilon$ lying in a range of $40° \leq \varepsilon \leq 75°$; and,
   said second reinforcement members each having an orientation which, together with the circumferential direction (U), encloses an angle $\beta$ lying in a range of $0° \leq \beta \leq 5°$;
   said third reinforcement members having like directions of inclination as said first reinforcement members as viewed in the circumferential direction (U);
   said belt including a fifth belt ply arranged outside of and on said fourth belt ply;
   said fifth belt ply having a plurality of parallel fifth reinforcement members;
   said fifth reinforcement members each having an orientation which, together with the circumferential direction (U), encloses an angle $\delta$ lying in a range of $40° \leq \delta \leq 75°$;
   said fifth reinforcement members having an opposite axial direction of inclination with respect to said first reinforcement members as viewed in the circumferential direction (U) and a like axial direction of inclination as said fourth reinforcement members;
   said third belt ply having a third axial extent; and,
   said fifth belt ply being configured to have a fifth axial extent less than said third axial extent of said third belt ply and greater than 70% of the width of said second belt ply.

2. The pneumatic vehicle tire of claim 1, wherein said third reinforcement members and said fourth reinforcement members are steel cords.

3. The pneumatic vehicle tire of claim 1, wherein:
   said third reinforcement members and said fourth reinforcement members each have a breaking force corresponding thereto; and,
   said third reinforcement members and said fourth reinforcement members are configured to have an extensibility D of D $\geq 0.2\%$ at 10% of the respective breaking force corresponding thereto.

4. The pneumatic vehicle tire of claim 1, wherein said second reinforcement members are made of steel.

5. The pneumatic vehicle tire of claim 1, wherein said second reinforcement members are steel cords having a breaking force; and, said second reinforcement members further have an extensibility D of D $\geq 0.2\%$ at 10% of said breaking force.

6. The pneumatic vehicle tire of claim 1, wherein said second reinforcement members are steel cords having a breaking force; and, said second reinforcement members further have an extensibility D of D $\geq 1\%$ at 10% of said breaking force.

7. The pneumatic vehicle tire of claim 1, wherein said first reinforcement members are steel cords.

8. The pneumatic vehicle tire of claim 1, wherein said fifth reinforcement members are steel cords.

* * * * *